US005566710A

United States Patent [19]

Dahlgren et al.

[11] Patent Number: 5,566,710

[45] Date of Patent: Oct. 22, 1996

[54] PRE-DETENT TACTILE FEEDBACK ASSEMBLY FOR A FLUID CONTROL VALVE

[75] Inventors: Derek A. Dahlgren, St. Paul; Jeffrey B. Wasson, Circle Pines, both of Minn.

[73] Assignee: Dana Corporation, Toledo, Ohio

[21] Appl. No.: 314,861

[22] Filed: Sep. 29, 1994

[51] Int. Cl.$^{6}$ .................................................... F16K 37/00

[52] U.S. Cl. ........................... 137/556; 137/596; 251/64; 251/297

[58] Field of Search ............................... 251/64, 297, 65; 137/596, 553, 556

[56] References Cited

U.S. PATENT DOCUMENTS

| | | | |
|---|---|---|---|
| 2,455,544 | 12/1948 | Yonkers . | |
| 2,958,501 | 11/1960 | Pickett et al. | 251/297 |
| 3,072,149 | 1/1963 | Hasbany . | |
| 3,174,500 | 3/1965 | Johnson et al. . | |
| 3,910,566 | 10/1975 | Pedersen et al. . | |
| 4,034,177 | 7/1977 | Sims, Jr. . | |
| 4,413,805 | 11/1983 | Green et al. | 251/297 |
| 4,457,342 | 7/1984 | Moen | 137/615 |
| 4,655,462 | 4/1987 | Balsells . | |
| 4,751,355 | 6/1988 | Wisskirchen et al. . | |
| 4,794,950 | 1/1989 | Gratzmuller | 251/297 |
| 4,827,982 | 5/1989 | Inagaki . | |
| 5,113,899 | 5/1992 | Yonezawa | 251/297 |

FOREIGN PATENT DOCUMENTS

| | | |
|---|---|---|
| 0278810 | 8/1988 | European Pat. Off. . |
| 983031 | 2/1965 | United Kingdom . |

OTHER PUBLICATIONS

Dana Drawing No. 22667002 dated Sep. 26, 1992.

*Primary Examiner*—A. Michael Chambers
*Attorney, Agent, or Firm*—MacMillan, Sobanski & Todd

[57] ABSTRACT

An improved pre-detent tactile feedback assembly for a fluid control valve is provided. The pre-detent tactile feedback assembly includes an elastic member seated within an annular groove formed in the bore of a plunger valve assembly. Preferably, this elastic member is a garter type spring. When the plunger is moved from an opened to a closed position, a portion of the plunger contacts the elastic member, urging the elastic member outwardly into the groove. The additional force required to urge the elastic member into the groove provides a "feel" force to the control lever. Preferably, the groove is positioned within the bore so that this "feel" force is sensed just prior to actuation of an associated detent assembly.

15 Claims, 4 Drawing Sheets

PRE-DETENT TACTILE FEEDBACK ASSEMBLY FOR A FLUID CONTROL VALVE

BACKGROUND OF THE INVENTION

This invention relates in general to fluid control valves and in particular to an improved structure for providing tactile feedback to an operator prior to actuation of a detent mechanism in such a fluid control valve.

In many hydraulic and pneumatic systems, control valves are provided for regulating the flow of fluid from a pressurized source to one or more controlled devices. Fluid control valves of this type generally include a case having a plurality of ports formed therein. A pressure port is provided which communicates with the pressurized source, while a tank port is provided which communicates with a fluid reservoir. One or more work ports are also provided which communicate with respective controlled devices. By selectively providing communication between the various ports, the operation of the controlled devices can be regulated in a desired manner.

For each of the work ports, a plunger valve assembly is typically provided within the case of the fluid control valve. Each of the plunger valve assemblies is operable to selectively provide communication between its associated work port and each of the pressure and tank ports. This is usually accomplished by means of an axially movable spool contained within the plunger valve assembly. The spool is movable upwardly and downwardly between opened and closed positions. In the opened position, the spool permits communication between the associated work port and the pressure port, thereby causing actuation of the controlled device. In the closed position, the spool provides communication between the associated work port and the tank port, thereby preventing actuation of the controlled device.

Axial movement of the spools is usually accomplished by means of a pivotable lever or joystick which is mounted on the upper end of the case. The lever is connected through respective linkages to each of the plunger valve assemblies. The lever is usually biased toward a center position. Pivoting movement of the lever in a first direction from the center position causes downward movement of the selected one of the spools from the closed position to the opened position. Similarly, pivoting movement of the lever in various other directions from the center position causes downward movement of the various other spools from the closed position to the opened position. The spools are usually biased upwardly by respective return springs toward the closed positions. These return springs typically react between spring seats formed on the case and portions of the associated linkages. As a result, an affirmative effort is required to pivot the lever from the center position so as to move the spools from their closed positions to their opened positions.

Fluid control valves of this type typically include a mechanism whereby the lever can be pivoted within a limited range of movement from the center position without opening either of the plunger valve assemblies. The purpose of this "dead band" range of movement is to prevent small movements of the lever from causing unintended movements of the spools and, therefore, operation of the controlled devices. To accomplish this "dead band" operation, a spring is usually provided in the linkage between the lever and each of the spools of the plunger valves. Once the lever has been pivoted beyond the end of the "dead band" range, the spool is moved from the closed position to the opened position. When this occurs, there is a step increase in the magnitude of the fluid pressure supplied to the controlled device, from zero pressure to a predetermined initial step pressure. Further pivoting movement of the lever causes a generally linear increase in the magnitude of the fluid pressure supplied to the controlled device from the initial step pressure to the maximum available system pressure.

In fluid control valves of this type, it is often desirable to provide a mechanism for temporarily retaining the lever in position once it has been pivoted to the point that the maximum available system pressure is being supplied to the controlled device. Such a detent mechanism thus allows the operator to release the lever while maintaining the supply of fluid pressure to the controlled device. The detent mechanism retains the lever in position until the operator applies a force to the lever which is sufficient to disengage the detent mechanism, or until the retaining force applied by the detent mechanism is otherwise released.

One common type of detent mechanism is known as an electromagnetic detent. Such a mechanism typically includes one or more armatures mounted to the base of the lever for pivoting movement therewith. Each of the armatures is aligned with an associated one of the plunger valve assemblies. One or more associated electromagnet assemblies are mounted on the control valve case so that pivotal movement of the lever brings one of the armatures into engagement with the associated electromagnet assembly. The magnetic force holds the armature to the electromagnet assembly until the operator manually pivots the lever to disengage the armature. Alternatively, a switch may be opened, for example by a predetermined movement of the controlled device, to de-energize the electromagnet assembly and release the armature.

In certain applications, it may be desirable to provide a supply of fluid pressure to the selected controlled device without actuating the detent mechanism. However, it is has been found to be difficult for an operator to accurately sense the point at which the detent mechanism will be actuated. Accordingly, a pre-detent tactile feedback mechanism has been used which provides a "feel" force to the lever just before the detent mechanism is engaged. Upon sensing this "feel" force, the operator is able to avoid further pivotal movement of the lever and the resulting actuation of the detent mechanism.

A number of such pre-detent tactile feedback mechanisms are known. In one such mechanism, a pair of ball bearings are disposed within a transverse cylindrical cavity in the plunger of the plunger valve assembly. A spring is also disposed within the cylindrical cavity between the two ball bearings to urge each of the ball bearings outwardly. As the plunger is moved axially within a bore in the case, the ball bearings roll in associated, longitudinally extending races formed in the bore. At the point at which the pre-detent "feel" force is desired, each of the races is provided with an inwardly extending projection. Thus, before the plunger can be moved axially further, the spring must be compressed to allow both of the ball bearings to move inwardly. This requires the application of additional force to the lever capable of being sensed by the operator. While such a pre-detent tactile feedback mechanism has been effective, it requires several additional parts and additional precision machining of the plunger and bore. In addition, it is difficult to disassemble the mechanism for maintenance.

In another type of pre-detent tactile feedback mechanism, a compression spring is disposed axially within the plunger bore. At the point at which the pre-detent "feel" force is desired, a specially threaded portion of the plunger contacts the spring. Additional axial movement of the plunger further compresses the spring, linearly increasing the force required to pivotally move the lever to the point where the maximum available system pressure is supplied to the controlled device. This also increases the force acting against the electro-magnetic detent used in the assembly. In addition, such a mechanism requires numerous special parts and is therefore relatively expensive.

It would therefore be desirable to provide an improved structure for a pre-detent tactile feedback mechanism for a fluid control valve which requires few parts and which is easy to assemble and disassemble. It would further be desirable to provide such an improved structure which effectively increases the force required to move the control lever just prior to engagement of the detent, but which does not significantly increase the force acting against the detent upon its actuation.

SUMMARY OF THE INVENTION

This invention relates to a fluid control valve including an improved structure for a pre-detent tactile feedback assembly. The control valve includes a case having a pressure port, a work port, and a bore which is capable of providing communication therebetween. A plunger is provided having at least a portion thereof disposed within the bore for movement between first and second plunger positions. A spool is also disposed within the bore for movement between a closed position and an opened position in response to the movement of the plunger from the first to the second plunger position. When the spool is in the closed position, fluid communication is prevented between the pressure and work ports. When the spool is in the opened position, fluid communication is permitted between the pressure and work ports. Preferably, a lever is pivotally supported on the case and is connected to the plunger so that pivotal movement of the lever causes the plunger to move between the first and second plunger positions.

The control valve is provided with a pre-detent tactile feedback assembly which includes an annular groove formed in the bore. An elastic member is seated within the groove with a portion thereof normally extending inwardly into the bore. Preferably, this elastic member is a garter type spring. When the plunger is moved from the first to the second plunger position, a portion of the plunger contacts the elastic member, urging the elastic member outwardly into the groove. The additional force required to urge the elastic member into the groove provides a "feel" force to the lever. Preferably, the groove is positioned within the bore so that this "feel force" is sensed just prior to actuation of an associated detent assembly. Thus, an improved pre-detent tactile feedback mechanism is provided which requires few parts and which is easy to assemble and disassemble.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
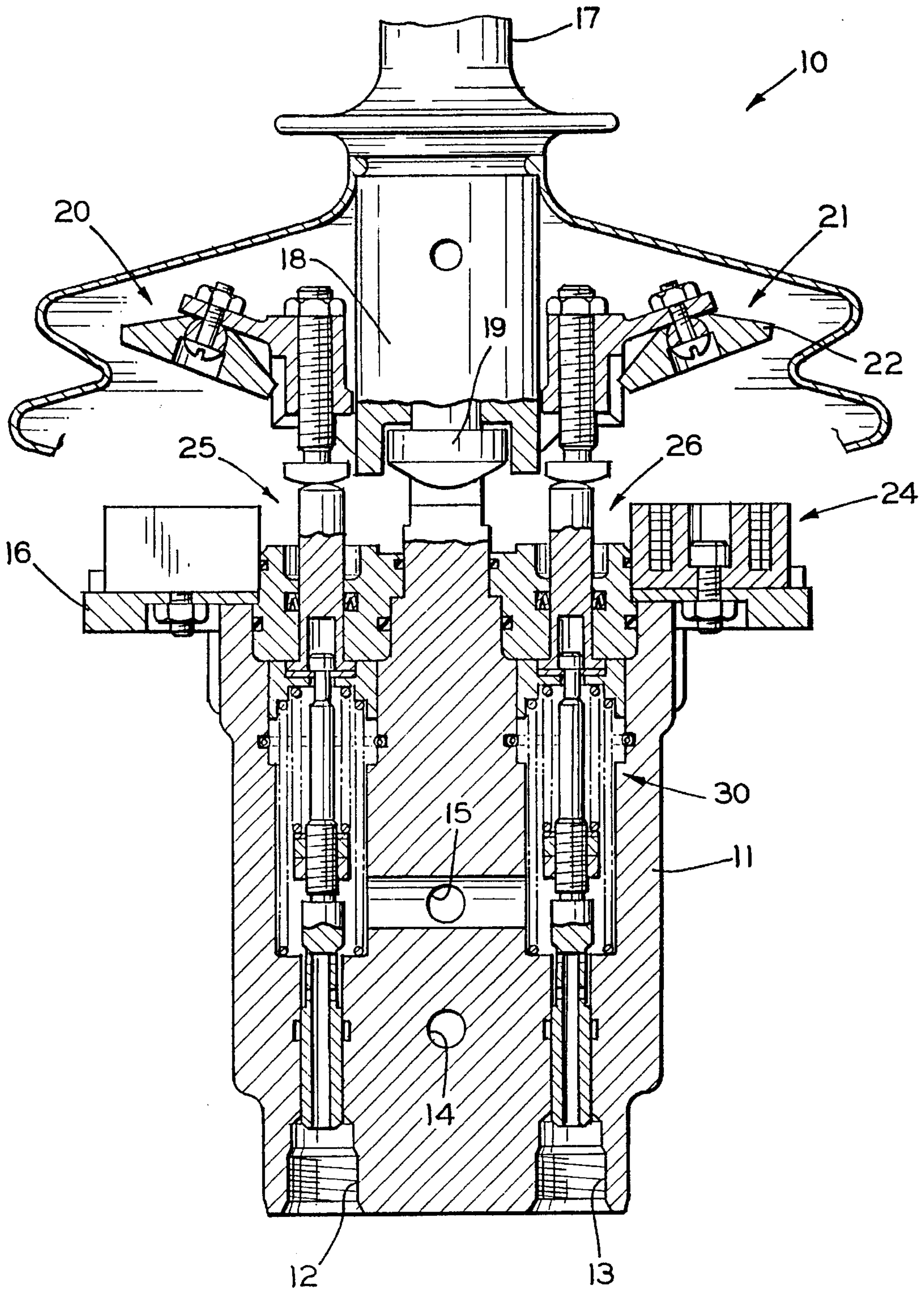
FIG. 1 is an elevational view, partially in cross section, of a fluid control valve including a pre-detent tactile feedback assembly in accordance with this invention.

Referring now to the drawings, there is illustrated in FIG. 1 a fluid control valve, indicated generally at 10, in accordance with this invention. The control valve 10 includes a lower case portion 11 having first and second work ports 12 and 13 formed therein. While two work ports are shown, it will be understood that the invention is suitable for use with fluid control valves having any number of work ports (and associated plunger valve assemblies, detents, and tactile feedback assemblies). The work ports 12 and 13 are adapted to communicate with respective fluid controlled devices (not shown) in a manner which is well known in the art. A pressure port 14 and a tank port 15 are also provided in the lower case portion 11. The pressure port 14 is adapted to communicate with a source of pressurized fluid (not shown), while the tank port 15 is adapted to communicate with a fluid tank or reservoir (not shown), again in a manner which is well known in the art.

The control valve 10 further includes an upper end portion 16 which is disposed co-axially above the lower case portion 11. The control valve 10 is operated by a lever or joystick 17 having a base portion 18 secured thereto. The base portion 18 of the lever 17 is pivotably secured relative to the upper end portion 16 by means of an x-y bracket 19. Thus, the lever 17 and the base portion 18 are capable of being pivoted in any direction relative to the upper end portion 16 as viewed in FIG. 1.

First and second detent assemblies, indicated generally at 20 and 21, are provided on the control valve 10. The first and second detent assemblies 20 and 21 are identical in structure and operation. The first and second detent assemblies 20 and 21 are associated with respective first and second plunger valve assemblies, as will be described in detail below. The first and second detent assemblies 20 and 21 retain the lever 17 in position once it has been pivoted to the point that the maximum available system pressure is being supplied to the selected controlled device. Because of their similarity, only the structure of the second detent assembly 21 (which is associated with the second plunger valve assembly and the work port 13) will be discussed herein.

The second detent assembly 21, which is conventional in the art, includes an armature 22 which is mounted to the base portion 18 of the lever 17 for movement therewith. The armature 22 thus moves in a curved path as the lever 17 and the base portion 18 are pivoted relative to the upper end portion 16 as viewed in FIG. 1.

The second detent assembly 21 also includes an electromagnet 24 secured to the upper end portion 16 of the control valve 10. As is well known, the electro-magnet is selectively connected to a source of electric current (not shown). The electromagnet 24 is secured on the upper end portion 16 so as to be positioned along the curved path of travel of the associated armature 22 as the lever 17 is pivoted in the clockwise direction as viewed in FIG. 1. As a result, the armature 22 engages the electromagnet 24 just after the lever 17 has been pivoted to the point that the maximum available system pressure is being supplied to the associated controlled device. If the electromagnet 24 is connected to the source of electric current, the magnetic force will hold the armature 22 to the electromagnet 24, thereby retaining the lever 17 in position. The operator may return the lever 17 to the center position by manually applying a sufficient force in the counter-clockwise direction, as viewed in FIG. 1. The lever 17 may also be returned to the center position by disconnecting the electromagnet 24 from its source of electric current, as is well known. While electromagnetic detent assemblies 20 and 21 are illustrated, any type of detent assembly is suitable for use with the control valve 10 of this invention.

As mentioned above, first and second plunger valve assemblies, indicated generally at 25 and 26, are mounted within the control valve 10. The first and second plunger valve assemblies 25 and 26 are identical in structure and operation. The first and second plunger valve assemblies 25 and 26 control the operation of the controlled devices communicating with the first and second work ports 12 and 13, respectively. Because of their similarity, only the structure of the second plunger valve assembly 26 (which is associated with the second detent assembly 21 and the work port 13) will be discussed herein.

The second plunger valve assembly 26 includes a plunger member 27 which is axially movable upwardly and downwardly within the control valve 10. The upper end of the plunger member 27 abuts the lower surface of one end of the base portion 18 of the lever 17. Thus, pivoting movement of the lever 17 in a clockwise direction from the illustrated center position causes downward movement of the plunger member 27. The lower end of the plunger member 27 is journalled for upward and downward axial movement in an annular transition member 28. The transition member 28 is secured between the upper end portion 16 and the lower case portion 11.

Figure 2:
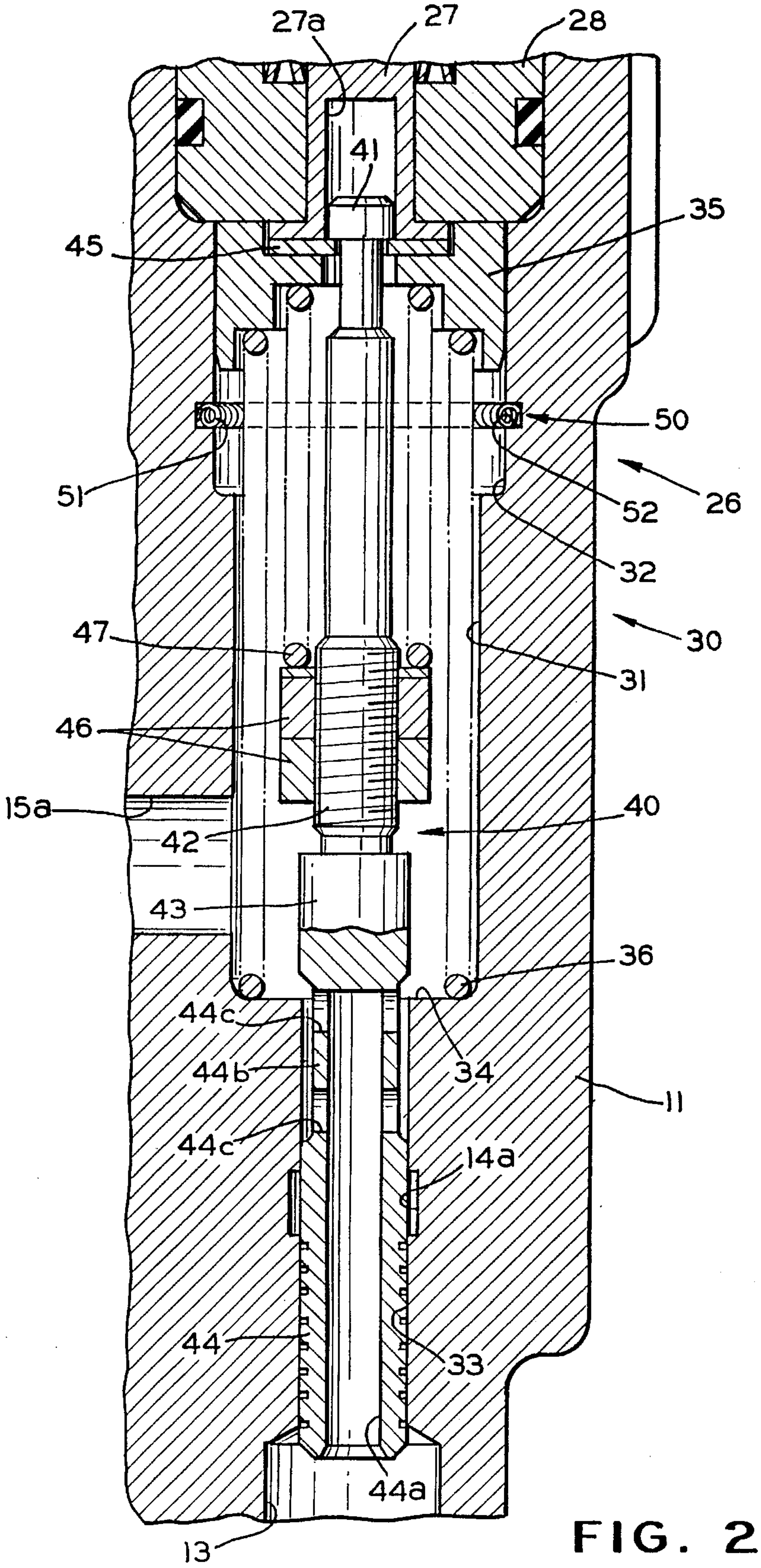
FIG. 2 is an enlarged view of a plunger valve assembly and associated pre-detent tactile feedback assembly illustrated in FIG. 1, wherein the spool is shown in a closed position.

Referring now to FIG. 2, the second plunger valve assembly 26 is illustrated in detail. The second plunger valve assembly includes a pilot pressure sub-assembly, indicated generally at 30, which is mounted within a bore 31 formed in the lower end of the lower case portion 11. As discussed above, the pilot pressure sub-assembly 30 is provided for setting the initial step pressure when the lever 17 of the control valve 10 is pivoted clockwise beyond the "dead band" range. The bore 31 is formed having a larger diameter upper portion 32 and a smaller diameter lower portion 33, thus defining a stepped shoulder 34 therebetween. The pilot pressure sub-assembly 30 includes an annular spring seat 35. The spring seat 35 is disposed in the upper bore portion 32 of the bore 31 adjacent to the lower end of the transition member 28 and to the lower end of the plunger member 27 extending through the transition member 28. A return spring 36 reacts between the stepped shoulder 34 and the spring seat 35, thus urging the spring seat 35 and the plunger member 27 upwardly within the bore 31. The lower end of the spring seat 35 is provided with a rounded or chamfered radially outer edge portion **35*a***.

The pilot pressure sub-assembly 30 further includes a spool, indicated generally at 40, which is axially movable upwardly and downwardly within the bore 31. The spool 40 includes an upper head portion 41, an elongated body portion 42, an enlarged valve seat portion 43, and a lower spool portion 44. The head portion 41 is disposed within the upper bore portion 32 and extends through the annular spring seat 35 into a recess **27*a* formed in the lower end of the plunger member 27. A two-piece split washer 45 is disposed between the lower end of the plunger member 27 and the upper end of the spring seat 35. The split washer 45 defines an inner diameter which is smaller in diameter than the head portion 41 of the spool 40. Thus, because the return spring 36 urges the spring seat 35 upwardly within the upper bore portion 32, the split washer 45 and the spool 40 are also urged upwardly. However, such upward movement is limited by the engagement of the spring seat 35 with the transition member 28**.

A portion of the outer surface of the body portion 42 of the spool 40 is threaded, and a pair of lock nuts 46 are threaded thereon. A pilot spring 47 reacts between the lock nuts 46 and the spring seat 35, thus urging the spool 40 downwardly relative to the spring seat 35. Thus, under the upward urging of the return spring 36 and the downward urging of the pilot spring 47, the spool 40 is normally maintained in the closed position shown in FIG. 2. In that closed position, the valve seat portion 43 of the spool 40 is axially spaced apart from the lower bore portion 33 of the bore 31. As a result, fluid communication is permitted between the upper bore portion 32 and the lower bore portion 33. Therefore, a passageway **15*a* communicating with the tank port 15 communicates with the upper bore portion 32 and the lower bore portion 33, as shown in FIG. 2**.

The lower spool portion 44 of the spool 40 is disposed within the lower bore portion 33 of the bore 31. The lower spool portion 44 is hollow, defining an internal passageway **44*a* which communicates with the work port 13. The lower spool portion 44 has a smaller diameter recessed area 44*b* formed therein which extends downwardly from the valve seat portion 43. A plurality of radially extending bores 44*c* are formed through the recessed area 44*b* of the lower spool portion 44. The bores 44*c* provide for fluid communication between the internal passageway 44*a* and the annular space surrounding the recessed area 44*b***.

The second plunger valve assembly 26 also includes a pre-detent tactile feedback assembly, indicated generally at 50, in accordance with this invention. The tactile feedback assembly 50 includes an annular, circumferentially elastic member 51 disposed within an annular groove 52 formed in the upper portion 32 of the bore 31. The elastic member 51 may be any suitable type of spring or ring of elastomeric material, such as rubber. The elastic member 51 is preferably a garter-type spring formed from a coil spring having its ends connected together. Preferably, the elastic member 51 is a garter-type spring having canted coils.

Figure 4:
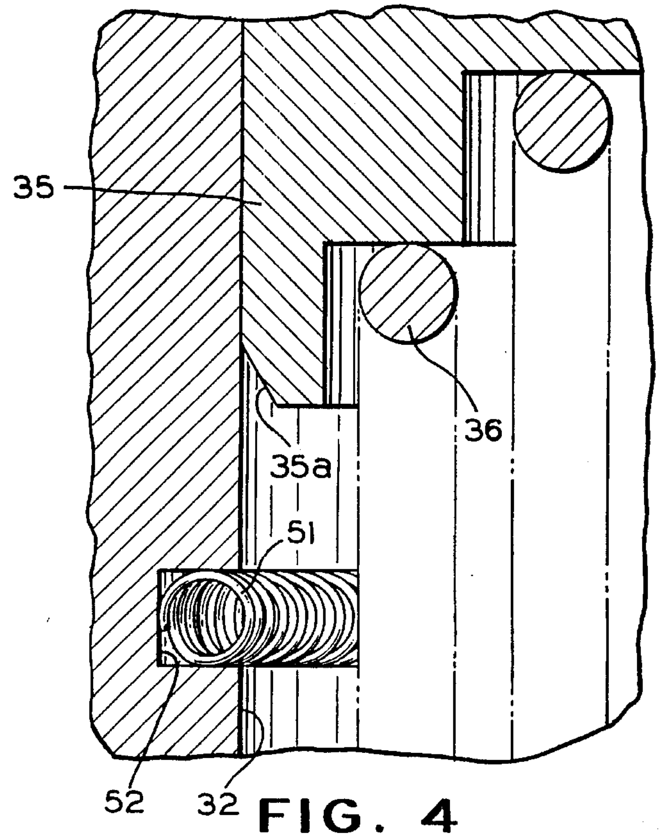
FIG. 4 is a further enlarged view of the pre-detent tactile feedback assembly as illustrated in FIG. 2.
Figure 5:
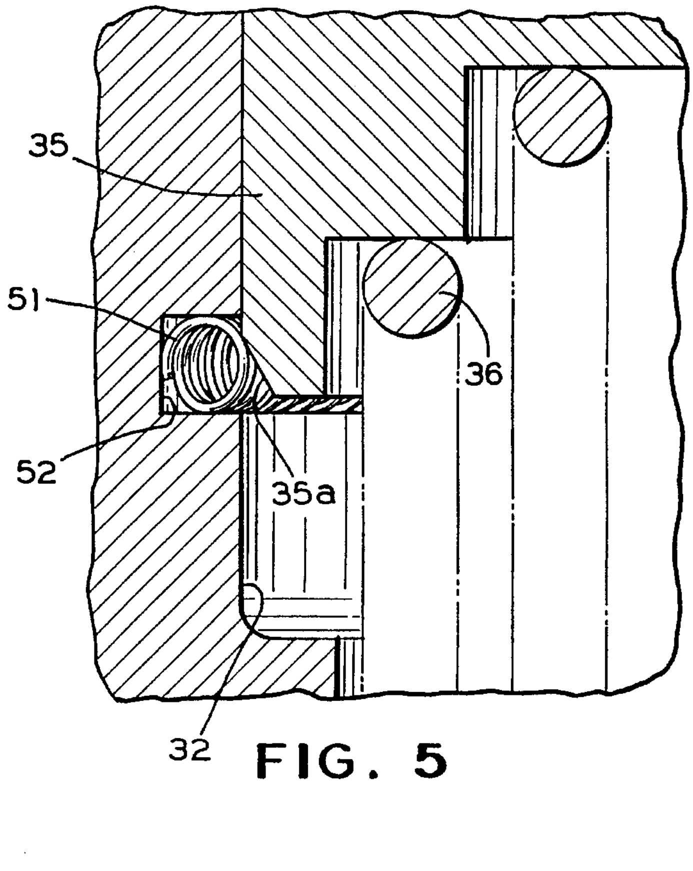
FIG. 5 is a further enlarged view of the pre-detent tactile feedback assembly as illustrated in FIG. 3.

The outer diameter of the elastic member 51 in its relaxed position is normally slightly larger than the diameter defined by the groove 52. As a result, the elastic member 51 retains itself within the groove 52. As best seen in FIG. 4, an annular portion of the elastic member 51 normally extends radially inwardly beyond the groove 52 in the bore 31 when the spring seat 35 is in the raised position. In this position, the inner diameter defined by the elastic member 51 is somewhat less than the outer diameter defined by the spring seat 35.

The operation of the control valve 10 will now be explained. When the lever 17 is in the center neutral position illustrated in FIG. 1, the plunger member 27 is positioned in abutment with the transition member 28 under the urging of the return spring 36. As a result, the spool 40 is maintained in the closed position shown in FIG. 2. In this closed position, the valve seat portion 43 of the spool 40 is axially spaced apart from the lower bore portion 33 of the bore 31, as mentioned above. As a result, fluid communication is permitted between the upper bore portion 32 and the lower bore portion 33. Thus, the upper bore portion 32 and the lower bore portion 33 are vented to the tank through the passageway 15*a* and the tank port 15. Also, in the closed position, the lower spool portion 44 of the spool 40 extends over a passageway 14*a* communicating with the pressure port 14. Consequently, no pressurized fluid from the pressure source is permitted to flow to the work port 13. In addition, in the closed position the spring seat 35 is maintained in a raised position where the edge 35*a* thereof is spaced above the elastic member 51 of the tactile feedback assembly 50.

When it is desired to operate the controlled device connected to the work port 13, the lever 17 is pivoted clockwise from the center position as viewed in FIG. 1. As discussed above, such pivoting movement causes the plunger member 27 to be moved downwardly. Because of the engagement of the plunger member 27 with the split washer 45 and the spring seat 35, the spring seat 35 is also moved downwardly against the urging of both the return spring 36 and the pilot spring 47. Since the pilot spring 47 reacts against the lock nuts 46 threaded onto the body portion 42 of the spool 40, a linearly increasing magnitude of force is exerted to urge the spool 40 downwardly within the bore 31. Inasmuch as there is little resistance to such downward movement, the spool 40 moves downwardly with the pivoting movement of the lever 17 to an open position.

Figure 3:
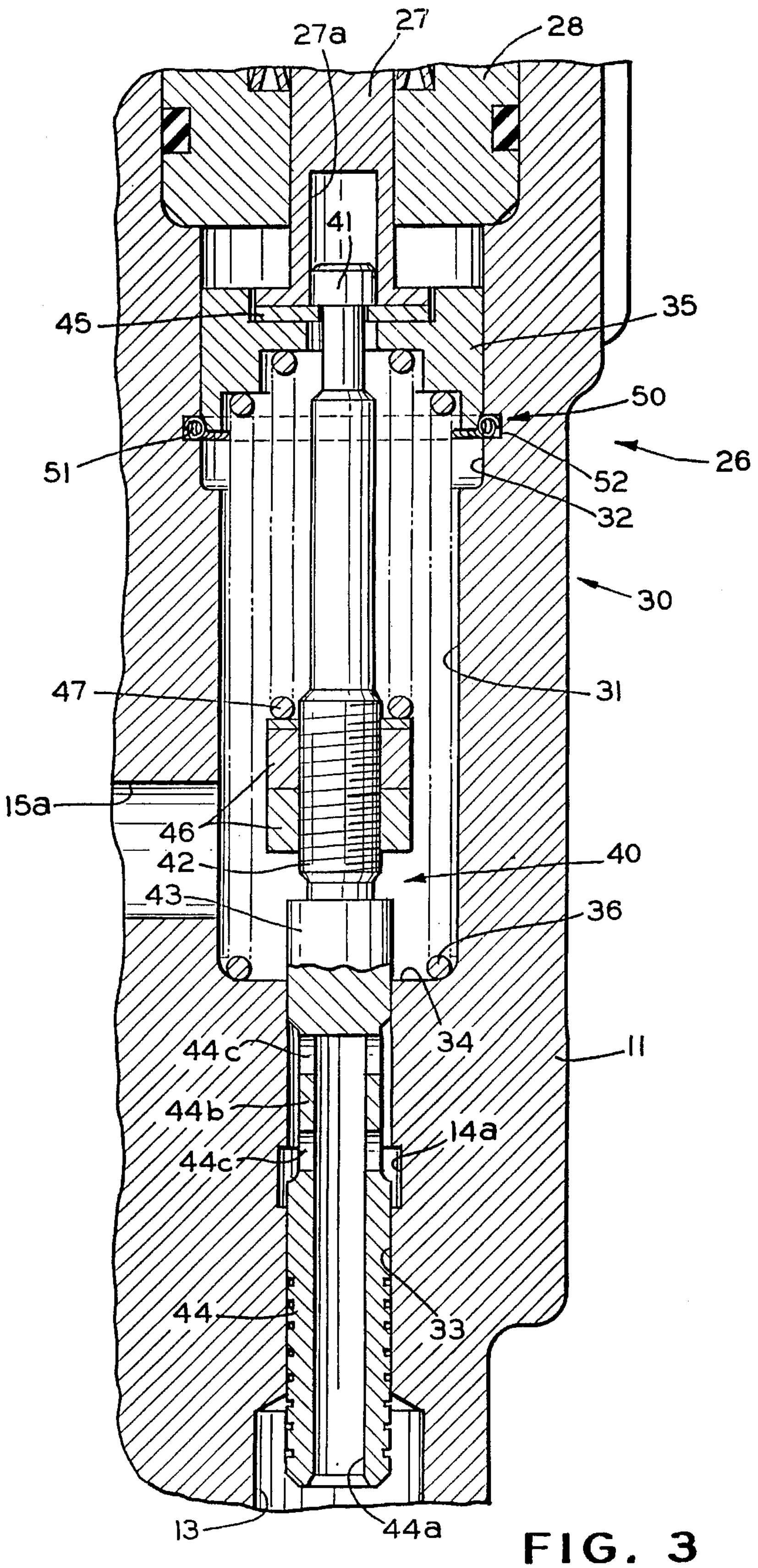
FIG. 3 is an enlarged view of a plunger valve assembly and associated pre-detent tactile feedback assembly similar to FIG. 2, wherein the spool is shown in an opened position and the pre-detent tactile feedback assembly has been actuated.

When the spool 40 has been moved downwardly to the opened position shown in FIG. 3, the valve seat portion 43 of the spool 40 is received within the lower bore portion 33 of the bore 31. Thus, fluid communication is no longer permitted between the lower bore portion 33 and the upper bore portion 32. At the same time, the smaller diameter recessed area 44*b* of the lower spool portion 44 is moved into communication with the passageway 14*a* and, therefore, the pressure port 14. Pressurized fluid from the pressure port 14 can then flow from the passageway 14*a* upwardly through the recessed area 44*b*, inwardly through the radial bores 44*c*, and downwardly through the internal passageway 44*a* to the work port 13. Thus, the fluid pressure in the work port 13 is immediately increased from zero pressure to an initial step pressure to operate the controlled device connected to the work port 13.

In addition, when the plunger member 27 and the spring seat 35 have been moved downwardly a sufficient distance, the outer edge 35*a* of the spring seat 35 will contact the elastic member 51. As a result, further downward movement of the plunger member 27 and spring seat 35 requires the radial expansion of the elastic member 51 outwardly into the groove 52. Therefore, the force required to downwardly move the plunger member 27 and spring seat 35 is increased, resulting in an increase in the force required to further pivot the lever 17. This increase is of a sufficient magnitude that it can be manually sensed by the operator, and is preferably in the range of about 1 to 2 pounds of additional required force. As will be appreciated, the magnitude of this "feel" force is determined by the spring force of the elastic member 51 and the geometry of the leading outer edge 35*a* of the spring seat 35. In addition, both the placement of the groove 52 within the upper portion 32 of the bore 31 and the geometry of the edge 35*a* of the spring seat 35 will determine the point at which this "feel" force will be applied. Preferably, as discussed above, the "feel force" is applied just prior to the actuation of the associated detent assembly 21.

Further pivoting of the lever 17 moves the plunger member 27, spring seat 35 and spool 40 further downwardly. Once the leading edge 35*a* of the spring 35 is beyond the elastic member 51, the elastic member 51 provides only a relatively small frictional drag force against the outer surface of the spring seat 35. This drag force is insignificant when compared to the normal operation forces provided by the return spring 36 and the pilot spring 47. Once the spool 40 has been moved downwardly to its fully opened position, the maximum available system pressure is supplied to the associated controlled device through the work port 13. If the lever 17 is pivoted slightly beyond this point, the armature 22 will engage the electromagnet 24 to actuate the detent assembly 21, thereby retaining the lever 17 in position.

In accordance with the provisions of the patent statutes, the principal and mode of operation of this invention have been explained and illustrated in its preferred embodiment. However, it must be understood that this invention may be practiced otherwise than as specifically explained and illustrated without departing from its spirit or scope.

What is claimed is:

1. A control valve comprising:

a case including a first port, a second port, and a bore which is capable of providing communication between said first and second ports;

a plunger having at least a portion thereof disposed within said bore for movement between first and second plunger positions;

a valve disposed within said bore and operably connected to said plunger for movement between a closed position when said plunger is located in said first plunger position, wherein fluid communication is prevented between said first and second ports, and an opened position when said plunger is located in said second plunger position wherein fluid communication is permitted between said first and second ports; and an elastic member mounted within said bore and positioned to engage a portion of said plunger during movement from said first plunger position to said second plunger position so as to provide a tactile indication of said movement.

2. The control valve defined in claim 1, wherein said elastic member is a circumferentially elastic member seated in an annular groove formed in said bore, with a portion of said elastic member normally extending inwardly into said bore.

3. The control valve defined in claim 2, wherein the outer diameter of said elastic member in a relaxed position is slightly larger than the diameter defined by said groove, so that said elastic member retains itself within said groove.

4. The control valve defined in claim 1, further including a lever mounted on said case for pivoting movement between first and second lever positions, said 1ever being connected to said plunger so that pivoting movement of said lever between said first said second lever position causes said plunger to move between said first and second plunger positions.

5. The control valve defined in claim 4, further including a detent for retaining said lever in said second lever position.

6. The control valve defined in claim 5, wherein said elastic member is positioned within said bore so that said plunger contacts said elastic member as said plunger is moved from said first plunger position toward said second plunger position, but prior to said plunger reaching said second plunger position.

7. The control valve defined in claim 1, wherein said valve includes a spool disposed within said bore and operably connected to said plunger for axial movement between a closed position, wherein fluid communication is prevented between said first and second ports, and an opened position, wherein fluid communication is permitted between said first and second ports, when said plunger is moved from said first plunger position to said second plunger position.

8. The control valve defined in claim 1, wherein said elastic member is a garter-type spring.

9. The control valve defined in claim 8, wherein said elastic member is a garter-type spring having canted coils.

10. A control valve comprising:

a case including a first port, a second port, a third port, a first bore which is capable of providing communication between said first and second ports, and a second bore which is capable of providing communication between said first and third ports;

a first plunger having at least a portion thereof disposed within said first bore for movement between first and second plunger positions;

a first valve disposed within said first bore and operably connected to said first plunger for movement between a closed position when said first plunger is located in said first plunger position, wherein fluid communication is prevented between said first and second ports, and an opened position when said first plunger is located in said second plunger position, wherein fluid communication is permitted between said first and second ports;

a second plunger having at least a portion thereof disposed within said second bore for movement between first and second plunger positions;

a second valve disposed within said second bore and operably connected to said second plunger for movement between a closed position when said second plunger is located in said first plunger position, wherein fluid communication is prevented between said first and third ports, and an opened position when said second plunger is located in said second plunger position, wherein fluid communication is permitted between said first and third ports;

an elastic member mounted within said first bore and positioned to engage a potion of said first plunger during movement from said first plunger position to said second plunger position so as to provide a tactile indication of said movement of said first plunger.

11. The control valve defined in claim 10, further including a lever mounted on said case for pivoting movement between first and second 1ever positions, said lever being connected to said first plunger so that pivoting movement of said lever between said first and second lever positions causes said plunger to move between said first and second plunger positions.

12. The control valve defined in claim 11, further including a detent for retaining said lever in said second lever position, wherein said first elastic member is positioned within said first bore so that said first plunger contacts said first elastic member as said first plunger is moved from said first toward said second plunger position, but prior to said first plunger reaching said second plunger position.

13. The control valve defined in claim 12 wherein said elastic member is a first elastic member, and further including a second elastic member mounted within said second bore and positioned to engage a portion of said second plunger during movement from said first plunger position to said second plunger position so as to provide a tactile indication of said movement of said second plunger.

14. The control valve defined in claim 13, wherein said lever is also mounted on said case for pivoting movement between first and third lever positions, said lever being connected to said second plunger so that pivoting movement of said lever between said first and third lever positions causes said second plunger to move between said first and second plunger positions.

15. The control valve defined in claim 14 wherein said detent is a first detent, and further including a second detent for retaining said lever in said third lever position, wherein said second elastic member is positioned within said second bore so that said second plunger contacts said second elastic member as said second plunger is moved from said first toward said second plunger position, but prior to said second plunger reaching said second plunger position.

* * * * *